(12) United States Patent
Miavitz

(10) Patent No.: US 10,765,088 B2
(45) Date of Patent: Sep. 8, 2020

(54) TUG TOY

(71) Applicant: FYF-JB, LLC, Old Saybrook, CT (US)

(72) Inventor: Robert J. Miavitz, Northfield, OH (US)

(73) Assignee: FYF-JB, LLC, Old Saybrook, CT (US)

( * ) Notice: Subject to any disclaimer, the term of this patent is extended or adjusted under 35 U.S.C. 154(b) by 363 days.

(21) Appl. No.: 15/826,341

(22) Filed: Nov. 29, 2017

(65) Prior Publication Data

US 2018/0077905 A1    Mar. 22, 2018

Related U.S. Application Data

(63) Continuation of application No. 15/377,406, filed on Dec. 13, 2016, now Pat. No. 9,848,580, which is a continuation of application No. 15/083,040, filed on Mar. 28, 2016, now Pat. No. 9,681,643, which is a continuation of application No. 14/529,665, filed on Oct. 31, 2014, now Pat. No. 9,295,232, which is a continuation of application No. 12/714,908, filed on Mar. 1, 2010, now Pat. No. 8,881,685.

(51) Int. Cl.
| | |
|---|---|
| *A01K 15/02* | (2006.01) |
| *A63H 5/00* | (2006.01) |
| *A63H 3/28* | (2006.01) |

(52) U.S. Cl.
CPC .......... *A01K 15/025* (2013.01); *A01K 15/026* (2013.01); *A63H 5/00* (2013.01); *A63H 3/28* (2013.01)

(58) Field of Classification Search
CPC ...... A01K 15/025; A01K 15/026; A63H 3/28; A63H 5/00
USPC .................. 119/702, 707, 709; 446/184, 397
See application file for complete search history.

(56) References Cited

U.S. PATENT DOCUMENTS

| | | | |
|---|---|---|---|
| 2,149,852 A | 3/1939 | Mahaffy | |
| 2,817,188 A | 12/1957 | Jefferson | |
| 3,702,038 A * | 11/1972 | Hakim | A63H 3/28 446/184 |
| 3,705,466 A | 12/1972 | Sela | |
| 3,792,490 A * | 2/1974 | Wigal | G11B 33/06 360/62 |
| 4,010,959 A * | 3/1977 | Smith | A63H 3/28 369/65 |
| 4,017,905 A * | 4/1977 | Convertine | G11B 33/06 360/90 |
| 5,162,012 A * | 11/1992 | Blandi | A63H 3/28 40/455 |
| 5,634,436 A * | 6/1997 | Coombs | A01K 15/025 119/707 |
| 6,892,674 B1 * | 5/2005 | Dubinins | A01K 15/026 119/702 |
| 8,186,309 B2 * | 5/2012 | Specht | A01K 15/026 119/707 |

(Continued)

FOREIGN PATENT DOCUMENTS

WO    WO-2007065194 A1 *    6/2007    ............... A63H 5/00

*Primary Examiner* — Yvonne R Abbott-Lewis
(74) *Attorney, Agent, or Firm* — Taft, Stettinius & Hollister LLP

(57) ABSTRACT

A tug toy includes at least one gripping member and a portion housing a noisemaker. The at least one gripping member is attached to the portion housing a noisemaker, and the at least one gripping member is adapted to transmit force to the portion housing a noisemaker.

19 Claims, 4 Drawing Sheets

(56) References Cited

U.S. PATENT DOCUMENTS

| | | | | |
|---|---|---|---|---|
| 9,282,724 B2 * | 3/2016 | Nunn | ............... | A01K 15/025 |
| D760,964 S * | 7/2016 | Toolan | ............... | D1/120 |
| 2002/0129774 A1 * | 9/2002 | Strongin | ............... | A01K 15/025 |
| | | | | 119/707 |
| 2003/0104757 A1 * | 6/2003 | Rasmussen | ............... | A63H 37/00 |
| | | | | 446/397 |
| 2005/0042972 A1 * | 2/2005 | Mann | ............... | A01K 15/026 |
| | | | | 446/183 |
| 2006/0121822 A1 * | 6/2006 | Willinger | ............... | A63H 3/28 |
| | | | | 446/184 |
| 2008/0064292 A1 * | 3/2008 | Willinger | ............... | A63H 5/00 |
| | | | | 446/397 |
| 2008/0146116 A1 * | 6/2008 | Di Lullo | ............... | A01K 15/025 |
| | | | | 446/297 |
| 2009/0266306 A1 * | 10/2009 | Edwards | ............... | A01K 15/026 |
| | | | | 119/709 |
| 2011/0114031 A1 * | 5/2011 | Mann | ............... | A01K 15/025 |
| | | | | 119/707 |

* cited by examiner

TUG TOY

CROSS-REFERENCE TO RELATED APPLICATIONS

This application is a continuation of U.S. application Ser. No. 15/377,406, filed on Dec. 13, 2016, which is a continuation of U.S. application Ser. No. 15/083,040, filed on Mar. 28, 2016 and now U.S. Pat. No. 9,681,643 issued Jun. 20, 2017, which is a continuation of U.S. application Ser. No. 14/529,665 filed on Oct. 31, 2014 and now U.S. Pat. No. 9,295,232 issued Mar. 29, 2016, which is a continuation of U.S. application Ser. No. 12/714,908 filed on Mar. 1, 2010 now U.S. Pat. No. 8,881,685 issued Nov. 11, 2014.

FIELD OF INVENTION

The present invention relates to tug toys, particularly a tug toy used by pets.

BACKGROUND OF THE INVENTION

The use of toys to entertain animals, particularly pets, have been widely used in the pet supply industry for many different purposes. For example, tug toys keep pets occupied. Tug toys also allow pets to chew on an object when they are "teething," they allow owners to play "fetch" with their pets, and tug toys can also be used to play with and/or train dogs. Noise makers such as squeak toys are known, however, there is currently no tug toy that emits a sound when at least two pets, or a pet and its owner, pull a tug toy. Therefore, what is needed is a tug toy that emits a sound when at least two pets, or a pet and its owner, pull both members of the tug toy.

SUMMARY OF THE INVENTION

The embodiments of the claimed invention pertain to tug toys, which may be used by pets.

In one embodiment of the claimed invention, a tug toy includes at least two gripping members and a central portion, wherein said at least two gripping members are attached to said central portion, and wherein said central portion further includes a noise maker.

In one embodiment of the claimed invention, said at least two gripping members comprise a first gripping member and a second gripping member, wherein said central portion further comprises: a cover that encapsulates a first retainer, a second retainer, and said noise maker, wherein said first and second retainer are attached to said first gripping member and said second gripping member, and wherein said noise maker is positioned between said first strap and said second retainer.

In one embodiment of the claimed invention, said tug toy further includes a third retainer, wherein said third retainer is attached to said first strap and said second retainer.

In another embodiment of the claimed invention, said cover is attached by a method selected from the group consisting of sewing, stitching, double-stitching, inner-stitching, and inner-double-stitching.

In yet another embodiment of the claimed invention, said tug toy further includes a third gripping member.

In still another embodiment of the claimed invention, said first gripping member, said second gripping member, and said third gripping member are equidistantly spaced from one another.

In another embodiment of the claimed invention, said at least two gripping members are a truncated triangular shape.

In yet another embodiment of the claimed invention, said at least two gripping members have an aperture.

In still another embodiment of the claimed invention, said at least two gripping members each include two pieces of fabric material attached by stitching.

In another embodiment of the claimed invention, said at least two gripping members further include padding between said two pieces of fabric material.

In yet another embodiment of the claimed invention, said at least two gripping members further include an attached portion, two sides, and an unattached portion.

In still another embodiment of the claimed invention, said attached portion is about two inches in length, wherein said two sides are about three inches in length, and wherein said unattached portion is about four inches in length.

In another embodiment of the claimed invention, said noise maker is a squeak ball.

In another embodiment of the claimed invention, a tug toy capable of being gripped by a pet, said tug toy includes first and second means for gripping said tug toy, attached to a central portion; means for making noise retained in said central portion; and means for compressing and decompressing said means for making noise.

In one embodiment of the claimed invention, said tug toy further includes a third means for gripping said tug toy, attached to said central portion.

In another embodiment of the claimed invention, said tug toy further includes means of enhancing said at least two gripping members' gripping capability.

In yet another embodiment of the claimed invention, a tug toy capable of being gripped by a pet, said tug toy includes at least two gripping members, a noise maker, and a cover, wherein said at least two gripping members are each formed by attaching two half-members, wherein said at least two gripping members are attached to one another, and wherein said noise maker is encapsulated by said cover and said at least two gripping members.

In one embodiment of the claimed invention, said tug toy further includes a retaining strap.

In another embodiment of the claimed invention, said at least two gripping members further includes an aperture.

In yet another embodiment of the claimed invention, said at least two gripping members includes two sides, an outer edge, and an inner edge, wherein said inner edge is about two inches in length, said two sides are about three inches in length, and said outer edge is about four inches in length.

It should also be understood that the various embodiments and aspects of the claimed invention may also be combined, except where the embodiments and aspects are not compatible in nature.

DETAILED DESCRIPTION OF THE CLAIMED INVENTION

Figure 1:
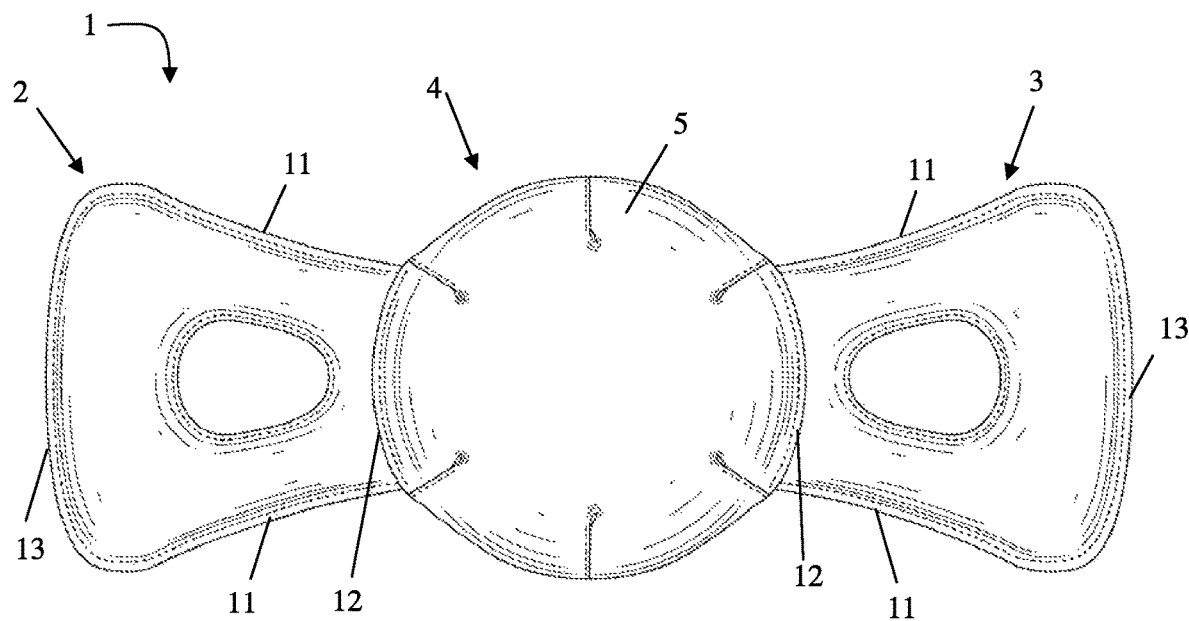
FIG. 1 is a top view of an embodiment of the claimed invention.
Figure 2:
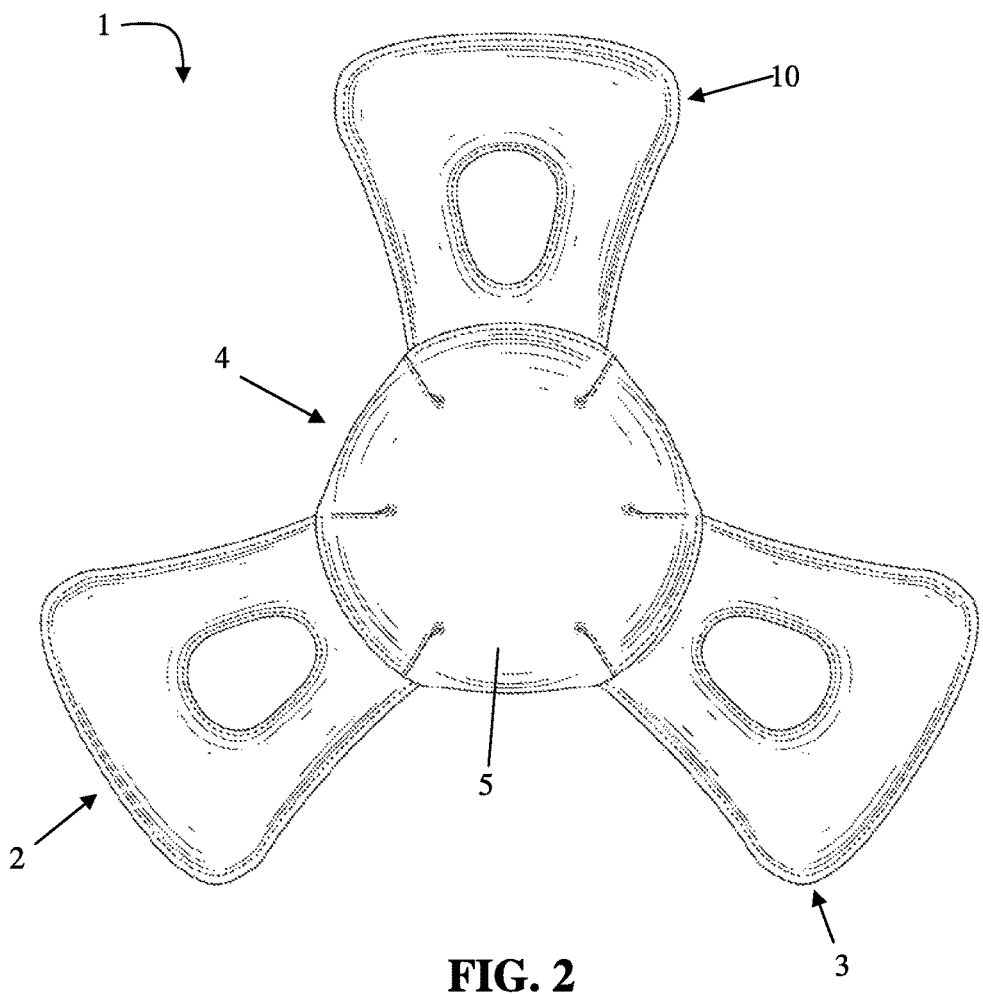
FIG. 2 is a top view of another embodiment of the claimed invention.
Figure 3:
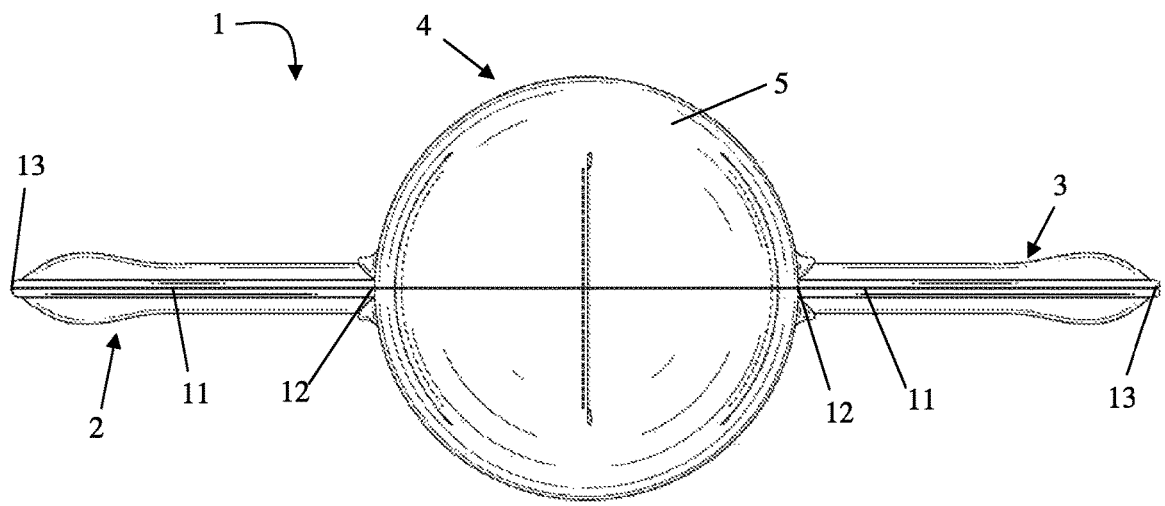
FIG. 3 is a side view of an embodiment of the claimed invention.
Figure 4:
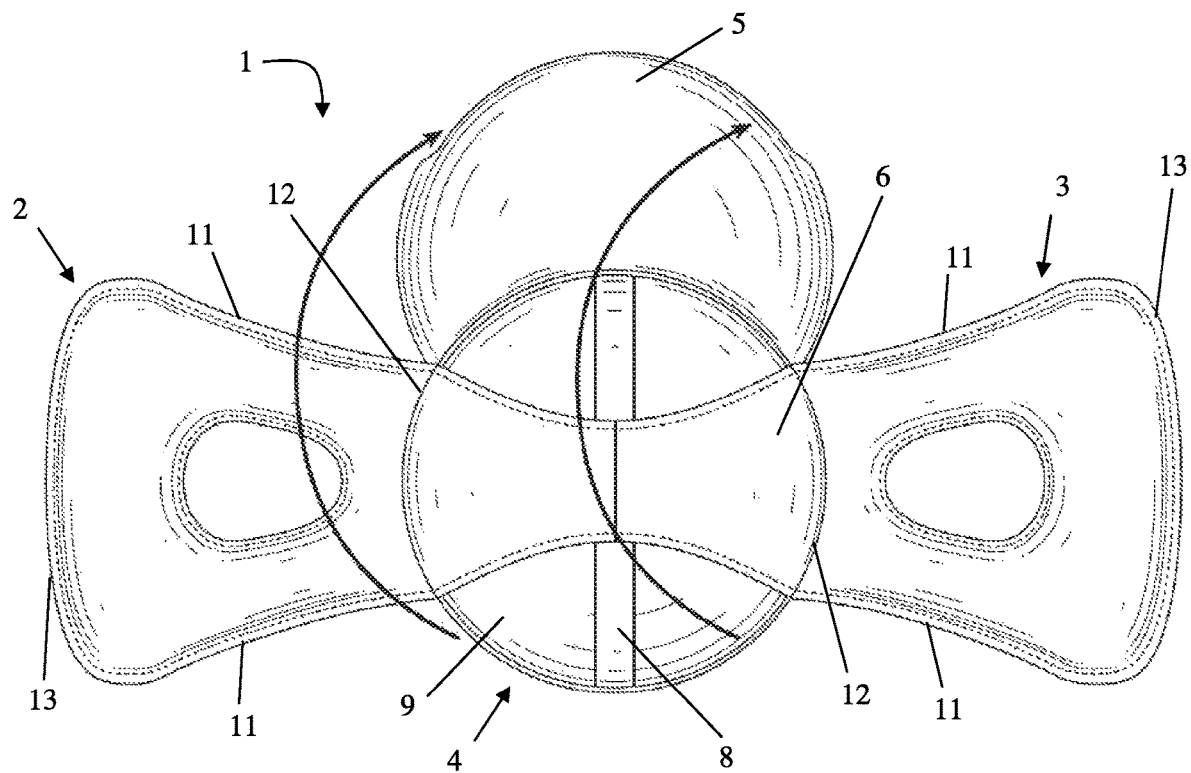
FIG. 4 is a top view of an embodiment of the claimed invention with the cover removed.

Referring now to the figures which are shown for purposes of illustrating embodiments of the invention only and not for purposes of limiting the same, FIGS. 1-5 show a tug toy 1 that may comprise a first gripping member 2, a second gripping member 3, and a central portion 4. The central portion 4 may further comprise a cover 5, a first retainer or strap 6, a second retainer or strap 7, a third retainer or strap 8, and a noise maker 9. The first gripping member 2 and the second gripping member 3 may comprise two sides 11, an attached portion 12, and an unattached portion 13. The attached portion 12 is the portion connecting the first gripping member 2 and the second gripping member 3 to the central portion 4. The first gripping member 2 and the second gripping member 3 may also be planar and on opposing sides of the central portion 4. FIGS. 1 and 3-5 show the tug toy 1 as having two gripping members, however, more than two may be utilized in the claimed invention as shown in FIG. 2, with a third gripping member 10. The first gripping member 2, the second griping member 3, and the third gripping member 10 may be equidistantly spaced from one another, or they may not be equidistantly spaced from one another. One gripping member may be closer to another gripping member while being further from the other gripping member.

Moreover, the first gripping member 2, the second gripping member 3, the third gripping member 10, the cover 5, the first strap 6, the second strap 7, and the retaining strap 8 may be attached to one another by sewing, stitching, double-stitching, inner-stitching, inner-double-stitching, or by any other method realized by persons of ordinary skill in the art, which may be strong enough to withstand the constant pulling and chewing by the pets, particularly dogs. The first gripping member 2, the second gripping member 3, the third gripping member 10, the cover 5, the first strap 6, and the second strap 7 may be made of a fabric material such as cotton, wool, nylon, polyester, and any other fabric material that may be realized by persons of ordinary skill in the art. There may also be padding or stuffing inside the first gripping member 2, the second gripping member 3, and the third gripping member 10 to support or enhance the pet's ability to grip the tug toy.

The noise maker 9 may be enclosed by the first strap 6, the second strap 7, and the retaining strap 8 so that the noise maker 9 may be encapsulated within the central portion 4. The noise maker 9 may also be a squeak ball. The first strap 6 may wrap over the top of the noise maker 9, while the second strap 7 may wrap under the bottom of the noise maker 9, or vice versa. The third retainer or strap 8 may also wrap around the sides of the noise maker 9, thereby encircling the noise maker 9. The retaining strap 8 may also be made of an elastic material such as a rubber band, elastic band, or any other elastic material that may be realized by persons of ordinary skill in the art that may expand and contract while still surrounding an object.

Figure 5:
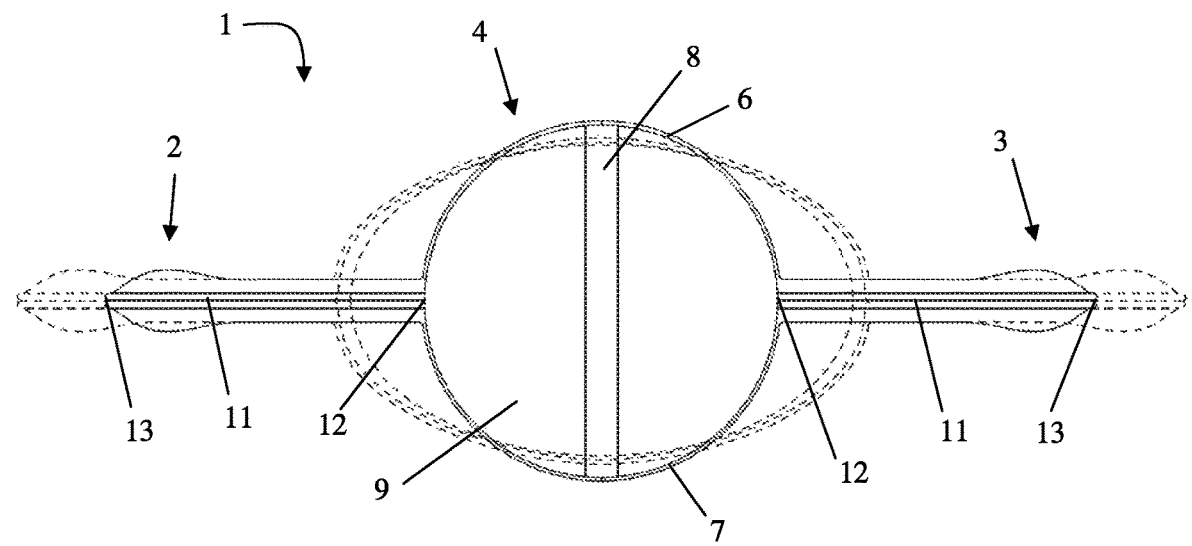
FIG. 5 is a side view of an embodiment of the claimed invention in a compressed position and non-compressed position.

When the first gripping member 2 and the second gripping member 3 are pulled simultaneously, as shown in FIG. 5, the first strap 6 and the second strap 7 may compress the noise maker 9, which then emits a sound. The sound may be a high-pitched sound such as a squeak. After the first gripping member 2 or the second gripping member 3 is released or brought closing to one another, the noise maker 9 may decompress, inflate with air, and emit a similar high-pitched sound. The operation of compression and decompression of the noise maker 9 may also include the third gripping member 10.

The first gripping member 2 and the second gripping member 3 may be a truncated triangular shape that may also include an aperture that may allow a pet to obtain a more firm grip on the tug toy 1. Moreover, the lengths of the two sides of the first gripping member 2 and the second gripping member 3 may vary depending on the type of pet the tug toy 1 is designed for and whether the tug toy 1 is a small, medium, or large version. In one embodiment of the claimed invention, with respect to the first gripping member 2 and the second gripping member 3, the attached portion may be about two inches, the two sides may be about three inches, and the unattached portion may be about four inches. The third gripping member 10 may also have similar or equivalent physical characteristics, dimensions, and proportions as the first gripping member 2 and the second gripping member 3.

Figure 6:
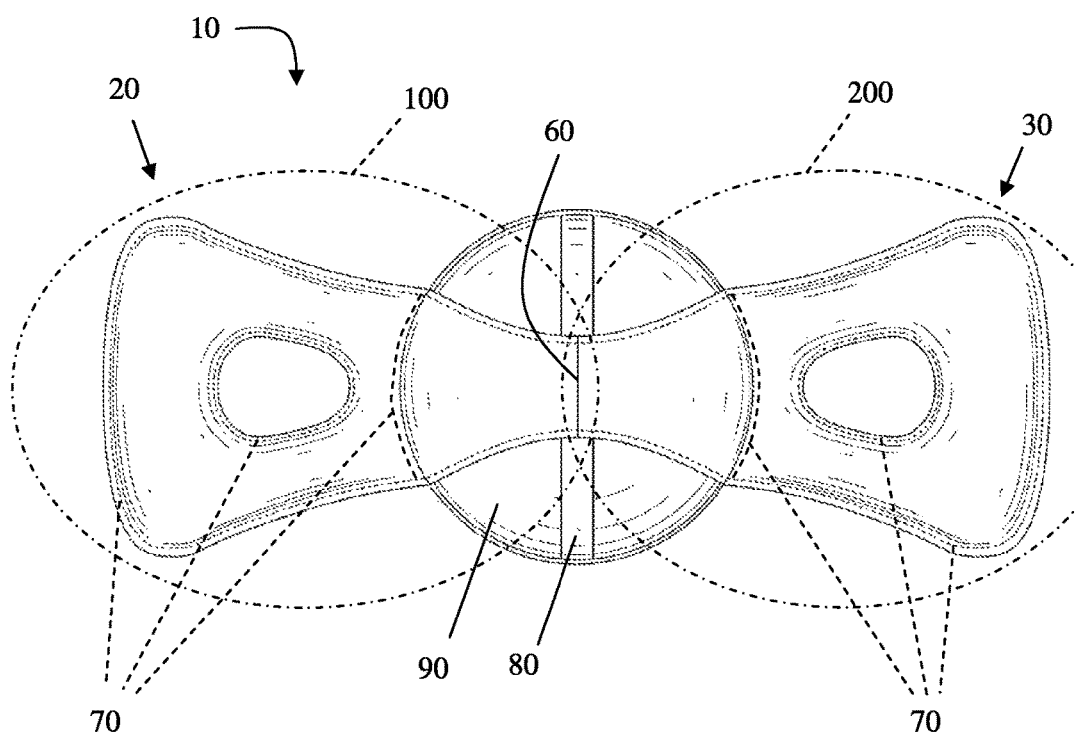
FIG. 6 is a top view of yet another embodiment of the claimed invention.
Figure 7:
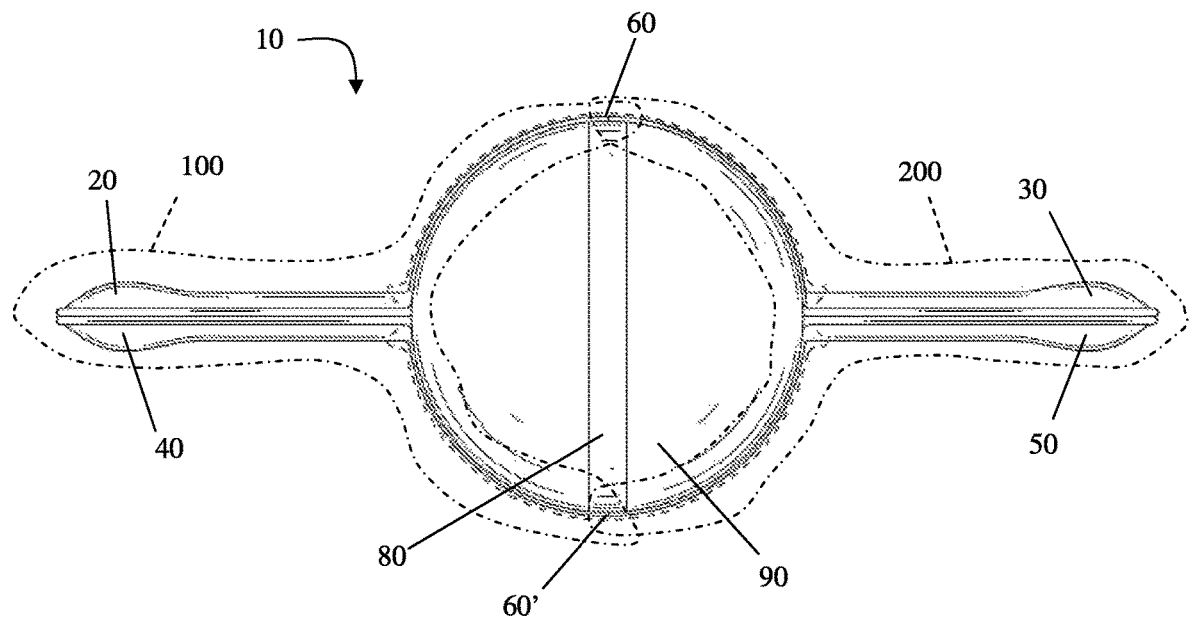
FIG. 7 is a side view of yet another embodiment of the claimed invention.

FIGS. 6 and 7 show another embodiment of the claimed invention, a tug toy 10 that may comprise of a first gripping member 100, a second gripping member 200, an end connecting portion 60, and end connecting portion 60', a member forming portion 70, a first retainer or strap 80, a noise maker 90, and a cover (not shown), wherein the first gripping member 100 may be further comprised of a first-half member 20 and a second-half member 40, and wherein the second gripping member 200 may be further comprised of a third-half member 30 and a fourth-half member 50. The first-half member 20, the second-half member 40, the third-half member 30, and the fourth-half member 50 may be four similarly shaped and made of similarly equivalent fabric material. The first gripping member 100 and the second gripping member 200 may be attached to one another at the end connecting portion 60 and 60'. The first-half member 20 and the second-half member 40 may form the first gripping member 100 by attaching to one another by forms of attachment as discussed above at the member forming portion 70. The third-half member 30 and the fourth-half member 50 may also form the second gripping member 200 by attaching to one another by forms of attachment as discussed above at the member forming portion 70. The first gripping member 100, the second gripping member 200, and the cover may encapsulate the noise maker and operate similar to the embodiment of the claimed invention as described above.

Figure 8:
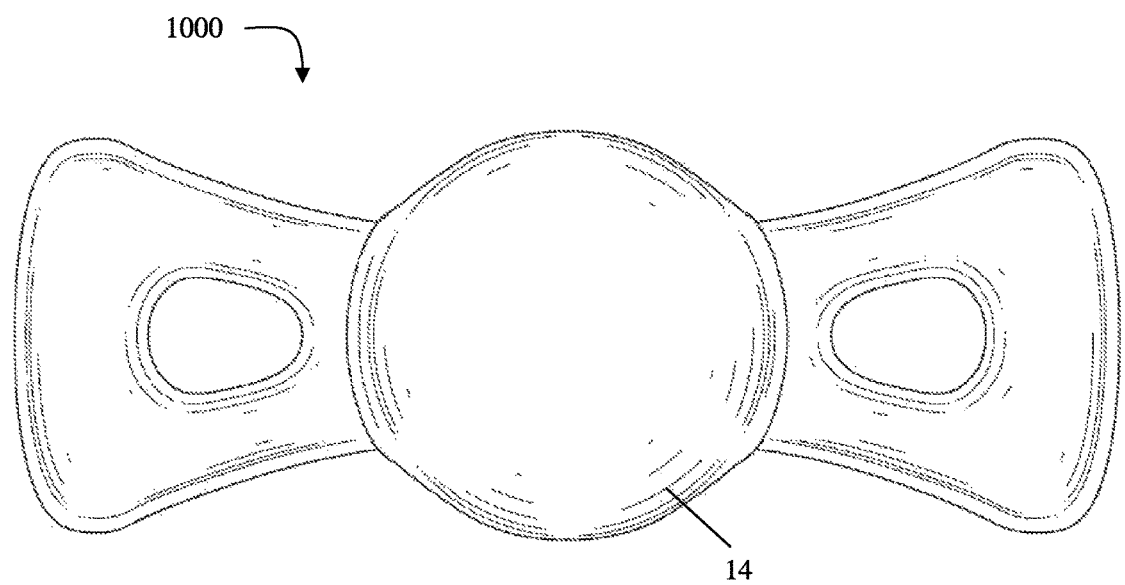
FIG. 8 is a top view of another embodiment of the claimed invention.

FIG. 8 shows a tug toy 1000 may also be constructed of a rubber material that may be molded to form the shape of the tug toy 10 as described in FIGS. 1-7. The tug toy 1000 may be a monolithic tug toy, wherein the noise maker 9, not shown, may be inserted into the interior of the monolithic tug toy by an opening 14. The opening 14 may be a slit or orifice that may allow an object the size of the noise maker 9 to be inserted and yet still retain its elastic properties, such as "closing" after the noise maker 9 has been inserted into the tug toy 1000 and thereafter retaining the noise maker 9 within the tug toy 1000. The tug toy 1000 may also be comprised of multiple portions, such as an upper portion and a lower portion, that may be molded and then later attached to form the tug toy 1000. Prior to attachment of the upper and lower portion, the noise maker 9 may be positioned towards the center and between the upper and lower portion, in order to retain the noise maker 9 upon attachment. The rubber material used to form the tug toy 1000 may be made of a rubber and/or like materials that may withstand the constant pulling and chewing from pets. Moreover, the multiple portions, such as the upper and lower portions, may be attached to one another by a method that can secure multiple rubber portions together and yet withstand the constant pulling and chewing from pets.

The invention has been described herein with reference to the disclosed embodiments. Obviously, modifications and alterations will occur to others upon a reading and understanding of this specification. It is intended to include all such modifications and alterations insofar as they come within the scope of the appended claims or the equivalence thereof.

What is claimed is:

1. A tug toy comprising:
   at least one gripping member and a portion housing a noisemaker, wherein said at least one gripping member is attached to said portion housing a noisemaker, and
   wherein said at least one gripping member is adapted to transmit force to said portion housing a noisemaker.

2. The tug toy according to claim 1, wherein said portion housing a noisemaker is adapted to receive force transmitted from the at least one gripping member and wherein said force activates the noisemaker.

3. The tug toy according to claim 2, wherein said force comprises a first lateral force directed away from the portion housing a noisemaker in the direction of a first gripping member.

4. The tug toy according to claim 3, wherein said force additionally comprises a second lateral force directed away from the portion housing a noisemaker in the direction of a second gripping member.

5. The tug toy according to claim 3, wherein said noisemaker comprises a squeak valve.

6. The tug toy according to claim 5, wherein said noisemaker comprises a reversibly compressible and decompressible structure having a squeak valve.

7. The tug toy according to claim 6, wherein said force comprises a first lateral force directed away from the portion housing a noisemaker in the direction of a first gripping member.

8. The tug toy according to claim 5, wherein said force comprises a first lateral force directed away from the portion housing a noisemaker in the direction of a first gripping member.

9. The tug toy according to claim 2, wherein said noisemaker comprises a squeak valve.

10. The tug toy according to claim 9, wherein said noisemaker comprises a reversibly compressible and decompressible structure having a squeak valve.

11. The tug toy according to claim 10, wherein said force comprises a first lateral force directed away from the portion housing a noisemaker in the direction of a first gripping member.

12. The tug toy according to claim 9, wherein said force comprises a first lateral force directed away from the portion housing a noisemaker in the direction of a first gripping member.

13. A tug toy comprising:
    at least one gripping member and a portion housing a noisemaker, wherein said at least one gripping member is attached to said portion housing a noisemaker,
    wherein said at least one gripping member is adapted to transmit force to said portion housing a noisemaker, and
    wherein said noisemaker comprises a squeak valve.

14. The tug toy according to claim 13, wherein said noisemaker comprises a reversibly compressible and decompressible structure having a squeak valve.

15. The tug toy according to claim 14, wherein said force comprises a first lateral force directed away from the portion housing a noisemaker in the direction of a first gripping member.

16. The tug toy according to claim 13, wherein said force comprises a first lateral force directed away from the portion housing a noisemaker in the direction of a first gripping member.

17. The tug toy according to claim 13, wherein said force additionally comprises a second lateral force directed away from the portion housing a noisemaker in the direction of a second gripping member.

18. A tug toy capable of being gripped by a pet, said tug toy comprising:
    a portion housing a means for making noise; and
    at least one means for gripping said tug toy attached to said portion housing a means for making noise;
    wherein the at least one means for gripping the tug toy is located adjacent the portion housing a means for making noise such that the means for making noise is activated when force is applied to the at least one means for gripping the tug toy along a first plane of said portion housing a means for making noise in a direction away from said portion housing a means for making noise, and
    wherein the means for making noise is a reversibly compressible and expandable structure.

19. The tug toy according to claim 18, wherein said at least one means for gripping the tug toy comprises first and second means for gripping the tug toy, wherein said first and second means for gripping the tug toy are attached to said portion housing a means for making noise, and wherein the means for making noise is activated when force is applied to the first or second means for gripping the tug toy along a first plane of said portion housing a means for making noise in a direction toward said first or second means for gripping the tug toy or both, and away from said portion housing a means for making noise.

* * * * *